(12) United States Patent
Wiesinger et al.

(10) Patent No.: US 10,032,214 B2
(45) Date of Patent: *Jul. 24, 2018

(54) SYSTEMS AND METHODS TO EXTRACT AND UTILIZE TEXTUAL SEMANTICS

(71) Applicant: eBay Inc., San Jose, CA (US)

(72) Inventors: Guenter Wiesinger, Landau (DE); Shilpa Jois Muguru Ramachandra, Cupertino, CA (US)

(73) Assignee: eBay Inc., San Jose, CA (US)

( * ) Notice: Subject to any disclaimer, the term of this patent is extended or adjusted under 35 U.S.C. 154(b) by 428 days.

This patent is subject to a terminal disclaimer.

(21) Appl. No.: 14/794,657

(22) Filed: Jul. 8, 2015

(65) Prior Publication Data

US 2015/0324471 A1    Nov. 12, 2015

Related U.S. Application Data

(63) Continuation of application No. 12/938,592, filed on Nov. 3, 2010, now Pat. No. 9,082,140.

(60) Provisional application No. 61/353,086, filed on Jun. 9, 2010.

(51) Int. Cl.
| | |
|---|---|
| *G06Q 30/06* | (2012.01) |
| *G06F 17/30* | (2006.01) |
| *G06F 17/27* | (2006.01) |

(52) U.S. Cl.
CPC ..... *G06Q 30/0641* (2013.01); *G06F 17/2705* (2013.01); *G06F 17/2785* (2013.01); *G06F 17/3053* (2013.01); *G06F 17/30705* (2013.01); *G06F 17/30731* (2013.01); *G06F 17/30867* (2013.01); *G06Q 30/06* (2013.01)

(58) Field of Classification Search
CPC .................................. G06Q 30/0601–30/0645
USPC ................................................ 705/26.1–27.2
See application file for complete search history.

(56) References Cited

U.S. PATENT DOCUMENTS

| | | |
|---|---|---|
| 9,082,140 B2 | 7/2015 | Wiesinger et al. |
| 2002/0143659 A1 | 10/2002 | Keezer et al. |
| 2003/0204447 A1 | 10/2003 | Dalzell et al. |
| 2006/0190350 A1 | 8/2006 | Maas |
| 2011/0307356 A1 | 12/2011 | Wiesinger et al. |

OTHER PUBLICATIONS

Savetz, K., & Gardiner, P. (1999). e shopper resources for web buying. Computer Shopper, 19(12), 132. Retrieved from https://dialog.proquest.com/professional/docview/668837263?accountid=142257.*

"U.S. Appl. No. 12/938,592, Response filed Aug. 21, 2013 to Non Final Office Action dated May 21, 2013", 12 pgs.

(Continued)

*Primary Examiner* — Resha Desai
(74) *Attorney, Agent, or Firm* — Schwegman Lundberg & Woessner, P.A.

(57) ABSTRACT

Systems and methods to extract and utilize textual semantics are described. The system receives item information that describes an item for publication on a network-based publication system and analyses the item information to generate application information that identifies a plurality of applications. The plurality of applications includes a first application that further includes the item as a first component of the first application. The system stores a listing in a database that includes the application information and the item information and publishes the listing on the network-based publication system.

19 Claims, 14 Drawing Sheets

(56) References Cited

OTHER PUBLICATIONS

"U.S. Appl. No. 12/938,592, Advisory Action dated Feb. 24, 2014", 3 pgs.
"U.S. Appl. No. 12/938,592, Advisory Action dated Jun. 22, 2012", 3 pgs.
"U.S. Appl. No. 12/938,592, Final Office Action dated Apr. 13, 2012", 16 pgs.
"U.S. Appl. No. 12/938,592, Final Office Action dated Nov. 12, 2013", 14 pgs.
"U.S. Appl. No. 12/938,592, Non Final Office Action dated May 21, 2013", 13 pgs.
"U.S. Appl. No. 12/938,592, Non Final Office Action dated Sep. 30, 2011", 14 pgs.
"U.S. Appl. No. 12/938,592, Non Final Office Action dated Oct. 1, 2014", 9 pgs.
"U.S. Appl. No. 12/938,592, Notice of Allowance dated Feb. 27, 2015", 11 pgs.
"U.S. Appl. No. 12/938,592, PTO Response to 312 Communication dated Jun. 8, 2015", 3 pgs.
"U.S. Appl. No. 12/938,592, Response filed Jan. 30, 2012 to Non Final Office Action dated Sep. 30, 2011", 13 pgs.
"U.S. Appl. No. 12/938,592, Response filed Feb. 2, 2015 to Non Final Office Action dated Oct. 1, 2014", 24 pgs.
"U.S. Appl. No. 12/938,592, Response filed Feb. 14, 2013 to Final Office Action dated Nov. 12, 2013", 11 pgs.
"U.S. Appl. No. 12/938,592, Response filed Jun. 13, 2012 to Final Office Action dated Apr. 13, 2012", 15 pgs.
"QRS and blue martini software to deliver web-ready merchandise (SM)", Free Online Library, [Online]. Retrieved from the Internet: <URL: http://www.thefreelibrary.com/QRS+and+Blue+Martini+Software+to+Deliver+Web-Ready+Merchandise(SM).-a058622459, (Jan. 18, 2000), 5 pgs.

\* cited by examiner

FIG. 1A
INFORMATION ENTERED BY SELLER
TO LIST PART FOR SALE 6
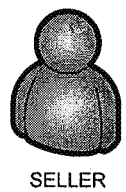
SELLER
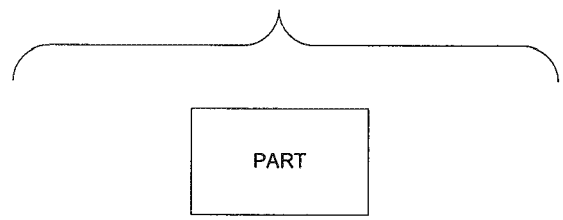
FIG. 1B
INFORMATION ENTERED BY BUYER 8
TO QUERY FOR LISTINGS
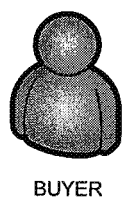
BUYER
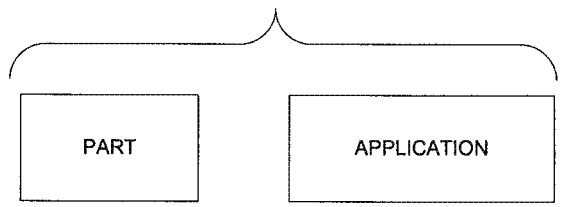

SYSTEMS AND METHODS TO EXTRACT AND UTILIZE TEXTUAL SEMANTICS

RELATED APPLICATIONS

This application is a continuation of U.S. patent application Ser. No. 12/938,592, filed on Nov. 3, 2010, which claims the priority benefit of U.S. Provisional Application No. 61/353,086, filed Jun. 9, 2010, the benefit of priority of each of which is claimed hereby, and each are incorporated herein by reference in their entirety.

TECHNICAL FIELD

This disclosure relates to the technical field of data communications and, more particularly, to systems and methods to extract and utilize textual semantics.

BRIEF DESCRIPTION OF THE DRAWINGS

Embodiments illustrated by way of example and not limitation in the figures of the accompanying drawings, in which:

FIG. 1A is a block diagram illustrating information entered by a seller, according to an embodiment, to list a part for sale;

FIG. 1B is a block diagram illustrating information entered by a buyer, according to an embodiment, to query for listings;

DETAILED DESCRIPTION

In the following description, for purposes of explanation, numerous specific details are set forth in order to provide a thorough understanding of some example embodiments. It will be evident, however, to one of ordinary skill in the art that embodiments of the present disclosure may be practiced without these specific details.

As described further below, according to various example embodiments of the disclosed subject matter described and claimed herein, systems and methods to extract and utilize textual semantics are described. Various embodiments are described below in connection with the figures provided herein. While many of the example embodiments are discussed in the context of determining a compatibility of automotive parts with particular vehicles, it will be appreciated that the methods and systems described herein may be applied to a broad range of compatibility use scenarios (e.g., parts for computers, washing machines, lawn mowers, scooters, buildings, doors, tractors, solar panels, bikes, airplanes, aircrafts, motorcycles, boats, or any other application that may be assembled with parts). Further, it will be appreciated that the methods and systems described herein may be applied to a broad range of technical problems, some of which are described as follows.

FIG. 1A is a block diagram illustrating information 6 entered by a seller to list a part for sale on an electronic marketplace. Consider a seller that desires to sell a part on an electronic marketplace. Typically, the seller provides information describing the part. For example, the seller may describe a set of brake pads by providing a title and description. In some instances, the seller may provide unstructured information describing one or more applications that are compatible with the part.

FIG. 1B is a block diagram illustrating information 8 entered by a buyer to find listings of parts. Consider a buyer that desires to acquire a part on an electronic marketplace. Typically the buyer provides information describing the part. In some instances, the buyer may provide an application that is compatible with the part. For example, the buyer may query "brake pads Toyota Tacoma Truck."

Figure 2:
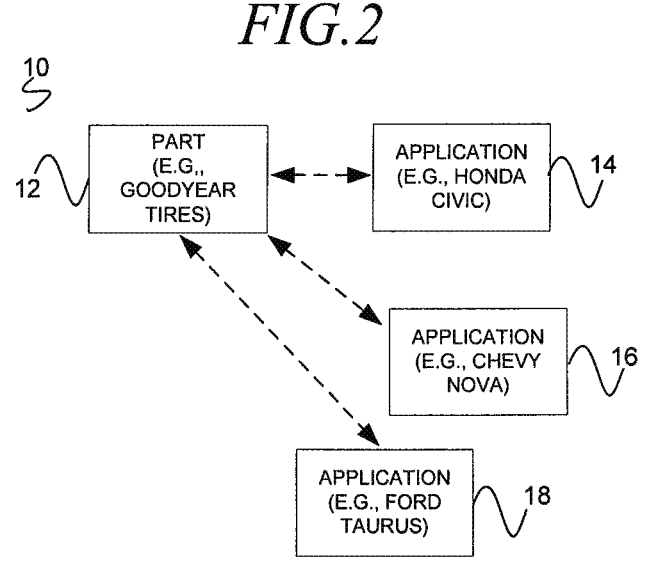
FIG. 2 is a block diagram illustrating a relationship, according to an embodiment, between a part and applications.

FIG. 2 is a block diagram illustrating a relationship 10, according to an embodiment, between a part 12 and one or more applications 14, 16, and 18. In the present context, an application may be any entity that is compatible with an item (e.g., part), is operable with an item, connects to an item, or otherwise may be combined with an item to render an operable combination. For example, an item may be an alternator and the alternator may fit an entity such as a Toyota Tacoma truck. Accordingly, the relationship 10 may be described as a "fits a" relationship 10 because the part 12 or item may be said to fit one or more of the applications 14. Indeed, the part 12 may further be said to be compatible with the applications 14, 16, and 18. For example, the part 12 in the form of "GOODYEAR TIRES" may fit or be compatible with applications 14, 16, and 18 in the form of a "HONDA CIVIC," "CHEVY NOVA." or a "FORD TAURUS." In contrast, other applications may not exhibit this relationship 10 with the part 12. Also for example, an item may be a lubricant (e.g. WD-40) that is identified as being operable in a procedure with an application in the form of a Toyota Tacoma Truck. That is, the lubricant may be said to be compatible with the Toyota Tacoma Tuck because the procedure identifies the lubricant as an acceptable product that is operable in completing the procedure for the Toyota Tacoma Tuck.

Figure 3:
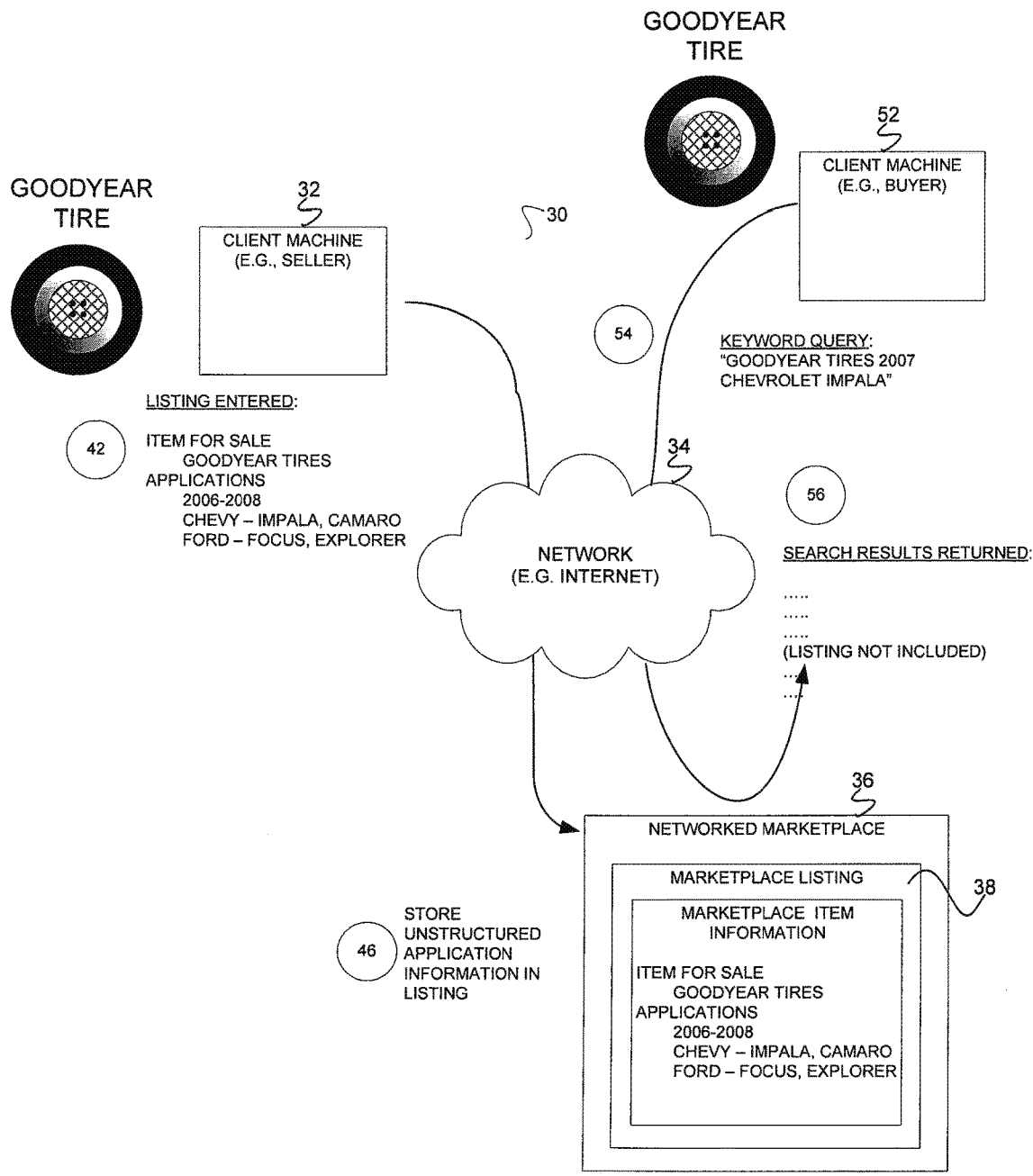
FIG. 3 is a block diagram illustrating a prior art system, according to an embodiment, to list and retrieve an item.

FIG. 3 is a block diagram illustrating a prior art system 30 to list and retrieve an item. The prior art system 30 is presented to illustrate a deficiency in the prior art with respect to listing an item on an electronic marketplace. The prior art system 30 includes a client machine 32 that communicates over a network 34 (e.g., the Internet) with a networked-marketplace 36. At operation 42, a seller at the client machine 32 may list a tire for sale, including unstructured application information. For example, the unstructured application information may describe a set of cars as shown under the heading "Applications" at operation 42 on FIG. 3. At operation 46, a marketplace listing 38 for the tire is stored on the networked-marketplace 36.

At operation 54, a buyer at a client machine 52 may enter a query for tires. For example, the query may include the following keywords "Goodyear Tires 2007 Chevrolet Impala." At operation 56, the networked marketplace 36 returns search results that do not include the marketplace listing 38 for the reason that the application identified in the query "2007 Chevrolet Impala" did not match any of the unstructured application information in the marketplace listing. That is, the phrase "Goodyear Tires 2007 Chevrolet Impala" is not matched with the unstructured application information "2006-2008, CHEVY—IMPALA" notwithstanding there being a semantic equivalence.

Aspects of the Present Disclosure

According to the present disclosure, systems and methods to extract and utilize textual semantics are described. According to one embodiment, a network-based marketplace may receive unstructured text from a seller describing applications for which an item (e.g., part) is compatible, convert the unstructured text to structured text that communicates the semantics of the unstructured text, create a listing on a network-based marketplace to sell or auction the item, with the listing including the structured text to communicate the semantics of the unstructured text, and respond to a query by retrieving the listing based on matching the query to the structured data. For example, the seller may provide unstructured text describing applications that are compatible with an item as follows:

Seller Provided Unstructured Text to List an Item for Sale
"For Sale—2 Goodyear Tires, like new, $55, Fits the following vehicles:
2006-2008
Chevy—Impala, Camaro
Ford—Focus, Explorer"

The system converts the unstructured text into structured data as follows:
Listing Created with Structured Data
"2006 Chevrolet Impala"
"2006 Chevrolet Camaro"
"2006 Ford Focus"
"2006 Ford Explorer"
"2007 Chevrolet Impala"
"2007 Chevrolet Camaro"
"2007 Ford Focus"
"2007 Ford Explorer"
"2008 Chevrolet Impala"
"2008 Chevrolet Camaro"
"2008 Ford Focus"
"2008 Ford Explorer"

The embodiment may be described in greater detail and operate as follows for an example embodiment. A seller may list a part for sale or auction on a network-based marketplace. To this end, the network-based marketplace may receive unstructured information in the form of item information (e.g., string) from the seller that describes the part and store the item information in a listing. The item information may further describe one or more applications for which the part is compatible. In response to receiving the string, the network-based marketplace may parse the string and automatically extract tokens that may be utilized to describe applications (e.g., vehicles) that include the part. A token is an atomic object that may include one or more words. The tokens may be identified based on keys in a dictionary that is generated based on a definition of an application. For example, the dictionary may be generated based on a definition of a vehicle including the year, make, and model of the vehicle. Further, the key may be associated with structured information in the form of a name-value pair. For example, any one of the tokens "CHEVY," "CHEVROLET," AND "CHEV" in the string of text may all be associated, via a dictionary key, with the name-value pair MAKE=CHEVROLET. Accordingly, the dictionary may be utilized to identify tokens in the string and normalize the tokens by associating the tokens to structured information in the form of name-value pairs that communicate the semantic of the tokens. After parsing the string to identify the tokens in the string, the network-based marketplace may associate the tokens with name-value pairs and organize the name-values pairs into value sets. For example, the value sets for a dictionary based on the definition of year, make and model may include three value sets of name-value pairs, including a value set of name-value pairs identifying year values, a value set of name-value pairs identifying make values, and a value set of name-value pairs identifying model values. Next, the system may cluster the name-value pairs from the value sets to exhaustively generate every possible group. For example, each group may include a name-value for a year, a name-value for make and a name-value for model. Accordingly, the final set of groups represents every possible permutation of the previously identified value sets. Next, the network-based marketplace may validate each group to remove false groups by utilizing a catalogue. For example, the system may identify whether a particular group exists by determining whether the group is in a catalogue of known vehicles. If the group is not found in the catalogue, then the group may be identified as a false positive and discarded. Next, the network-based marketplace may store the groups (e.g., applications) in the listing for the part. Finally, the system may receive a query from a buyer that identifies the part and any of the above mentioned applications, retrieve the listing by matching the part and application in the query with the part and structured application information in the listing to retrieve the listing and communicate the listing in search results to the buyer.

Figure 4:
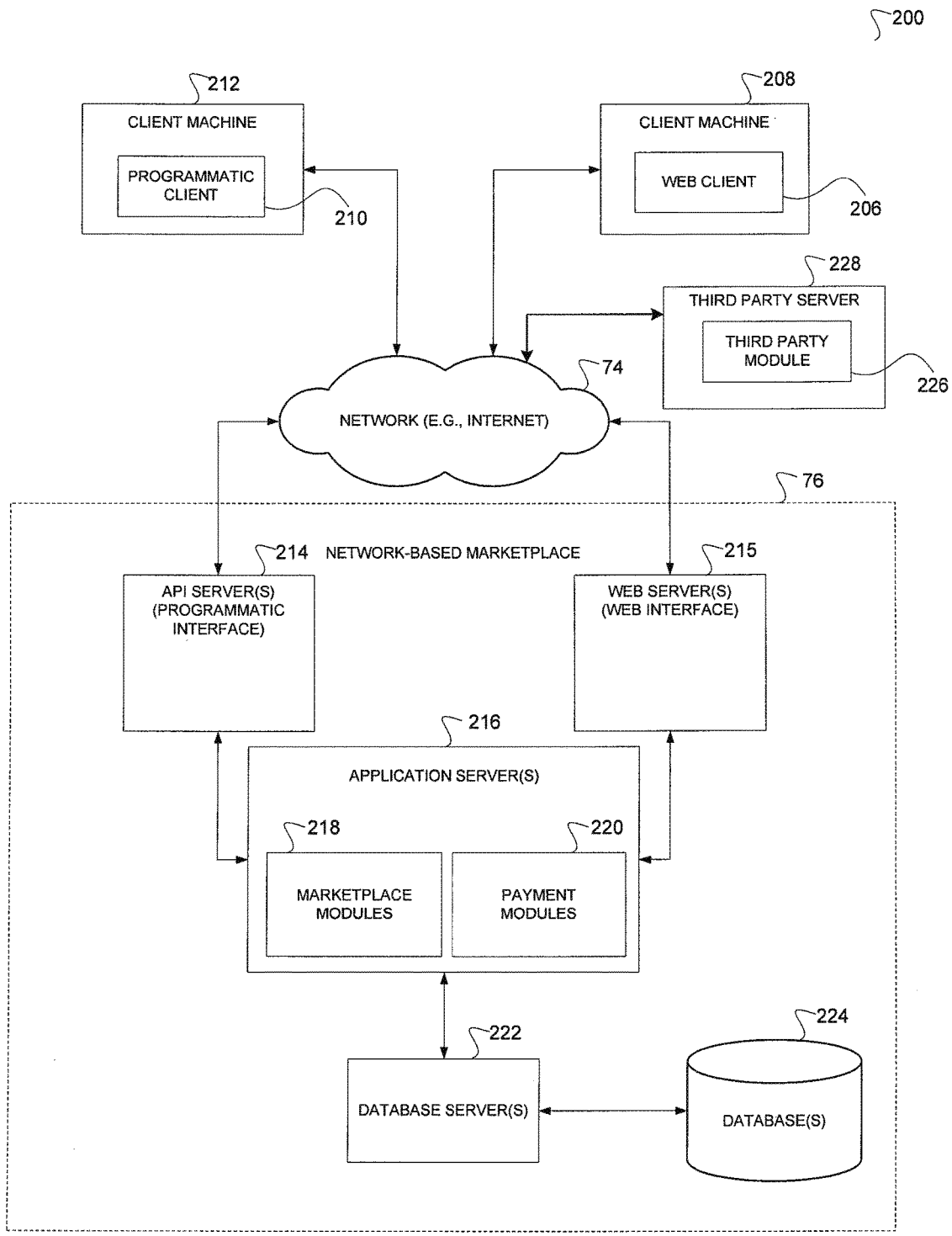
FIG. 4 is a block diagram illustrating a system, according to an embodiment, to execute the methods described herein.

FIG. 4 is a network diagram depicting a networked system 200, within which one example embodiment may be deployed. A network-based marketplace 76 provides server-side functionality, via a network 74 (e.g., the Internet or Wide Area Network (WAN)) to one or more clients. FIG. 4 illustrates, for example, a web client 206 (e.g., a browser, such as the Internet Explorer browser developed by Microsoft Corporation of Redmond, Wash. State) executing on a client machine 208 and a programmatic client 210 executing on client machine 212.

An application program interface (API) server 214 and a web server 215 are coupled to, and provide programmatic and web interfaces respectively to, one or more application servers 216. The application servers 216 host one or more marketplace modules 218 and payment modules 220. The application servers 216 are, in turn, shown to be coupled to one or more database servers 222 that facilitate access to one or more databases 224.

The marketplace modules 218 may provide a number of marketplace functions and services to users that access the network-based marketplace 76. The payment modules 220 may likewise provide a number of payment services and functions to users. The payment modules 220 may allow users to accumulate value in accounts and then to later redeem the accumulated value for products (e.g., goods or services) that are made available via the marketplace modules 218. Value may be accumulated in a commercial currency, such as the U.S. dollar, or a proprietary currency, such as "points." While the marketplace modules 218 and payment modules 220 are shown in FIG. 4 to both form part of the network-based marketplace 76, it will be appreciated that, in alternative embodiments, the payment modules 220 may form part of a payment service that is separate and distinct from the network-based marketplace 76.

Further, while the networked system 200 shown in FIG. 4 employs a client-server architecture, embodiments of the present disclosure are, of course, not limited to such an architecture and could equally well find application in a distributed, or peer-to-peer, architecture system, for example. The various marketplace modules 218 and payment modules 220 could also be implemented as standalone software programs, which do not necessarily have networking capabilities.

The web client 206 and mobile programmatic client 210 access the various marketplace modules 218 and payment modules 220 via the web interface supported by the web server 215. Similarly, the programmatic client 210 accesses the various services and functions provided by the marketplace modules 218 and payment modules 220 via the programmatic interface provided by the API server 214. The programmatic client 210 may, for example, be a seller module (e.g., the TurboLister application developed by eBay Inc., of San Jose, Calif.) to enable sellers to author and manage listings on the network-based marketplace 76 in an off-line manner, and to perform batch-mode communications between the programmatic client 210 and the network-based marketplace 76.

FIG. 4 also illustrates a third party module 226, executing on a third party server machine 228, as having programmatic access to the networked system 200 via the programmatic interface provided by the API server 214. For example, the third party module 226 may, utilizing information retrieved from the network-based marketplace 76, support one or more features or functions on a website hosted by the third party. The third party website may, for example, provide one or more promotional, marketplace or payment functions that are supported by the relevant modules of the networked system 200.

Marketplace and Payment Modules

Figure 5:
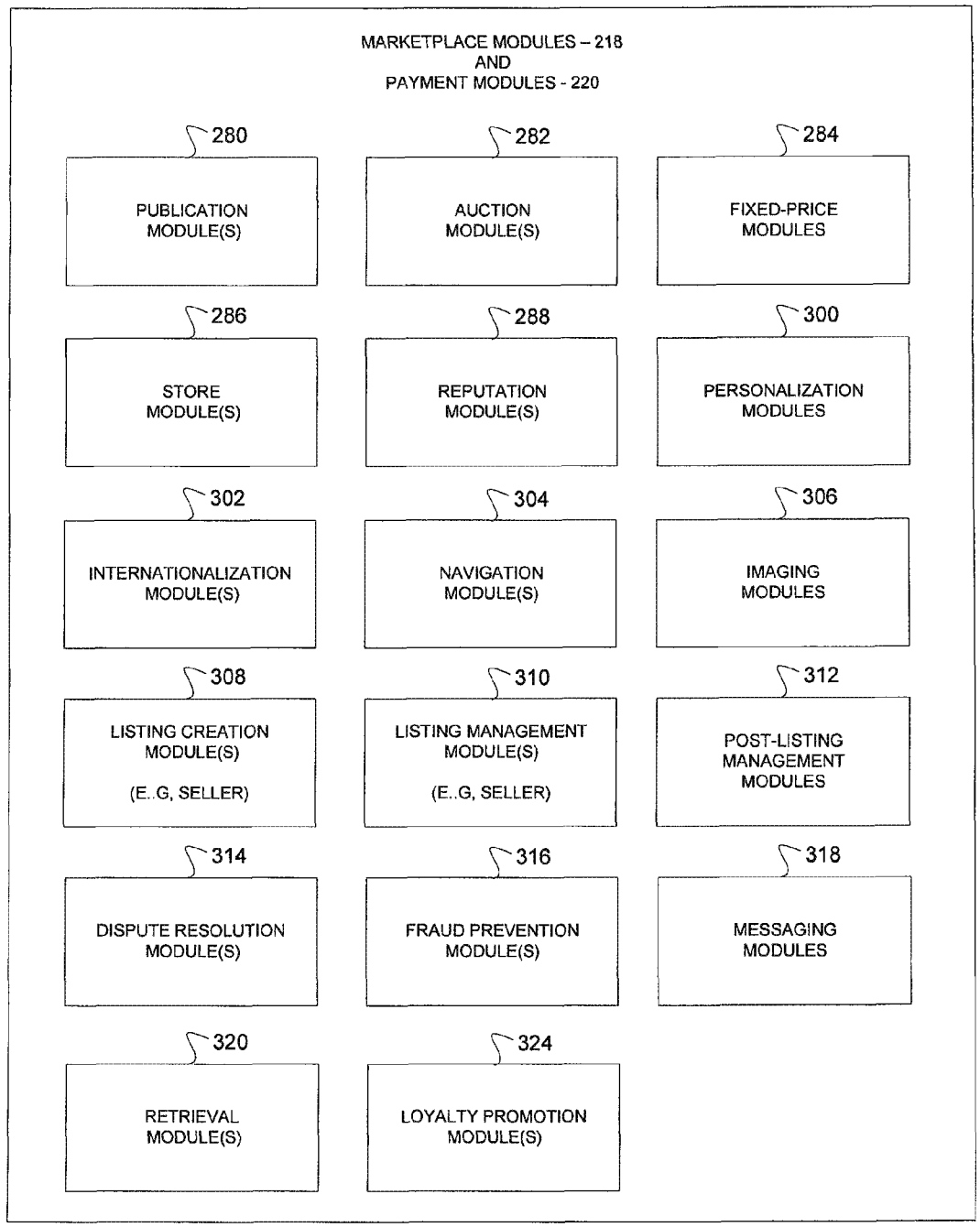
FIG. 5 is a block diagram illustrating marketplace modules and payment modules, according to an embodiment.

FIG. 5 is a block diagram illustrating marketplace modules 218 and payment modules 220 (e.g., software applications) that, in one example embodiment, are provided as part of the networked system 200 of FIG. 4. The marketplace modules 218 and payment modules 220 may be hosted on dedicated or shared server machines, as shown in FIG. 4, that are communicatively coupled to enable communications between server machines. The modules themselves are communicatively coupled (e.g., via appropriate interfaces) to each other and to various data sources, so as to allow information to be passed between the modules or so as to allow the modules to share and access common data. The modules may furthermore access one or more databases 224 via the database servers 222, as shown in FIG. 4.

The network-based marketplace 76 may provide a number of publishing, listing and price-setting mechanisms whereby a seller may list (or publish information concerning) goods or services for sale; a buyer can express interest in or indicate a desire to purchase such goods or services; and a price can be set for a transaction pertaining to the goods or services. To this end, the marketplace and payment modules 218 and 220 are shown to include at least one publication module 280 and one or more auction modules 282 that support auction-format listing and price setting mechanisms (e.g., English, Dutch, Vickrey, Chinese, Double, Reverse auctions, etc.). For example, the publication module(s) 280 may include a publishing module 281 (not shown) that may be utilized to store a listing in a database and publish the listing on the network-based marketplace. The various auction modules 282 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price modules 284 may support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings and may allow a buyer to purchase goods or services, which are also being offered for sale via an auction, for a fixed-price that is typically higher than the starting price of the auction.

Store modules(s) 286 may allow a seller to group listings within a "virtual" store, which may be branded and otherwise personalized by and for the seller. Such a virtual store may also offer promotions, incentives and features that are specific and personalized to a relevant seller.

Reputation module(s) 288 may allow users that transact, utilizing the network-based marketplace 76, to establish, build and maintain reputations, which may be made available and published to potential trading partners. Consider, for example, that where the network-based marketplace 76 supports person-to-person trading, users may otherwise have no history or other reference information whereby the trustworthiness and credibility of potential trading partners may be assessed. The reputation module(s) 288 allow a user to establish a reputation within the network-based marketplace 76 over time, for example, through feedback provided by other transaction partners. Other potential trading partners may then reference such a reputation for the purposes of assessing credibility and trustworthiness.

Personalization modules 300 may allow users of the network-based marketplace 76 to personalize various aspects of their interactions with the network-based marketplace 76. For example a user may, utilizing appropriate personalization modules 300, create a personalized reference page at which information regarding transactions to which the user is (or has been) a party may be viewed. Further, the personalization modules 300 may enable a user to personalize listings and other aspects of their interactions with the networked system 200 and other parties.

The networked system 200 may support a number of marketplaces that are customized, for example, for specific geographic regions. A version of the networked system 200 may be customized for the United Kingdom, whereas another version of the networked system 200 may be customized for the United States. Some of these versions may operate as an independent marketplace, or may be customized (or internationalized) presentations of a common underlying marketplace. The networked system 200 may accordingly include a number of internationalization modules 302 that customize information (and/or the presentation of information) by the networked system 200 according to predetermined criteria (e.g., geographic, demographic or marketplace criteria). For example, the internationalization modules 302 may be used to support the customization of information for a number of regional websites that are operated by the networked system 200.

Navigation of the network-based marketplace 76 may be facilitated by one or more navigation modules 304. For example, browse modules may allow users to browse various category, catalogue, or inventory data structures according to which listings may be classified within the networked system 200. Various other navigation modules 304 may be provided to supplement the search and browsing modules.

In order to make listings available via the networked system 200 as visually informing and attractive as possible, the marketplace and payment modules 218 and 220 may include one or more imaging modules 306 with which users may upload images for inclusion within listings. The imaging modules 306 may also operate to incorporate images within viewed listings. The imaging modules 306 may also support one or more promotional features, such as image galleries that are presented to potential buyers. For example, sellers may pay an additional fee to have an image included within a gallery of images for promoted items.

Listing creation modules 308 may allow sellers to conveniently author listings of items (e.g., parts) pertaining to goods or services that they wish to transact via the network-based marketplace 76. For example, the listing creation modules 308 may enable sellers to identify their items as products. Also for example, the listing creation modules 380 may include a receiving module for receiving unstructured information in the form of item information (e.g., string) and a processing module that may parse the unstructured information to generate structured information that is stored by the publishing module 281 in a listing. The listing management modules 310 may allow sellers to manage such listings. Specifically, where a particular seller has authored and/or published a large number of listings, the management of such listings may present a challenge. The listing management modules 310 may provide a number of features (e.g., auto-relisting, inventory level monitors, etc.) to assist the seller in managing such listings.

One or more post-listing management modules 312 may also assist sellers with a number of activities that may typically occur post-listing. For example, upon completion of an auction facilitated by one or more auction module(s) 282, a seller may wish to leave feedback regarding a particular buyer. To this end, the post-listing management modules 312 may provide an interface to one or more reputation module(s) 288, so as to allow the seller to conveniently provide feedback regarding multiple buyers to the reputation module(s) 288.

Dispute resolution modules 314 may provide mechanisms whereby disputes arising between transacting parties may be resolved. For example, the dispute resolution modules 314 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention modules 316 may implement fraud detection and prevention mechanisms to reduce the occurrence of fraud within the network-based marketplace 76.

Messaging modules 318 may be responsible for the generation and delivery of messages to users of the network-based marketplace 76, with such messages, for example, advising users regarding the status of listings at the network-based marketplace 76 (e.g., providing "outbid" notices to bidders during an auction process or providing promotional and merchandising information to users). Respective messaging modules 318 may utilize any one of a number of message delivery networks and platforms to deliver messages to users. For example, messaging modules 318 may deliver electronic mail (e-mail), instant message (IM), Short Message Service (SMS), text, facsimile, or voice (e.g., Voice over IP (VoIP)) messages via the wired network (e.g., the Internet), Plain Old Telephone Service (POTS), or wireless (e.g., mobile, cellular, WiFi (e.g., IEEE 802.11 technologies including 802.11n, 802.11b, 802.11g, and 802.11a)), and Worldwide Interoperability for Microwave Access (e.g., WiMAX—IEEE 802.16) networks.

Retrieval modules 320 may support various searching functions that are made available to buyers to enable buyers to find listings. For example, the retrieval modules 320 may include a retrieving module 329 that receives a query from a buyer to identify listings. The network-based marketplace 76 itself, or one or more parties that transact via the network-based marketplace 76, may operate loyalty programs that are supported by one or more loyalty promotions modules 324. For example, a buyer may earn loyalty or promotions points for transactions established and/or concluded with a particular seller, and may then be offered a reward for which accumulated loyalty points can be redeemed.

Figure 6A:
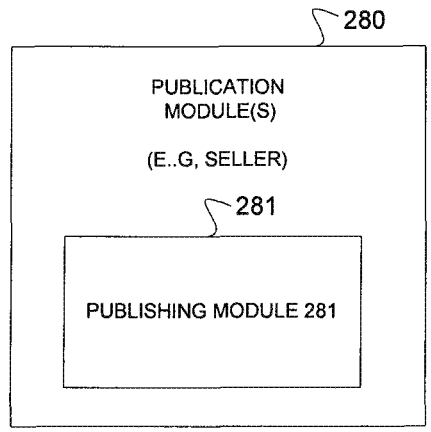
FIG. 6A is a block diagram illustrating listing publication modules, according to an embodiment.

FIG. 6A is a block diagram illustrating the publication modules 280, according to an embodiment. The publication modules 280 may be utilized to publish, as described above. The publication modules 280 may include a publishing module 281. The publishing module 281 may store application information that is structured in a listing, store the listing in the database 224 and publish the listing on the network-based marketplace 76.

Figure 6B:
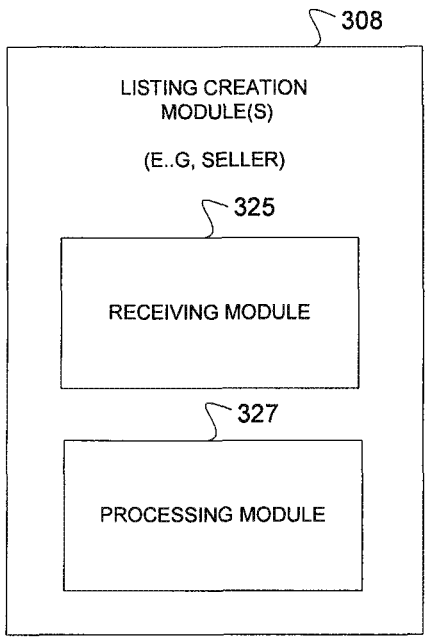
FIG. 6B is a block diagram illustrating listing creation modules, according to an embodiment.

FIG. 6B is a block diagram illustrating the listing creation modules 308, according to an embodiment. The listing creation modules 308 may be utilized to create listings, as described above. The listing creation modules 308 may include a receiving module 325 and a processing module 327. The receiving module 325 may receive unstructured information in the form of item information (e.g., string) that describes an item for sale on a network-based marketplace. For example, the receiving module 325 may receive the item information from a seller or from a listing, as described further below. The processing module may be utilized to analyze the item information to generate application information that is structured or item specific information that is structured, as described further below.

Figure 6C:
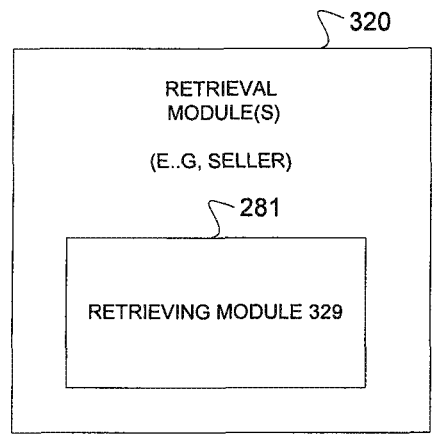
FIG. 6C is a block diagram illustrating retrieval modules, according to embodiment.

FIG. 6C is a block diagram illustrating the retrieval modules 320, according to an embodiment. The retrieval modules 320 may be utilized to retrieve, as described above. The retrieval modules 320 may include a retrieving module 329. The retrieving module 329 may receive a query, retrieve listings from the database 224 based on the query and communicate the listings over a network.

Data Structures

Figure 7:
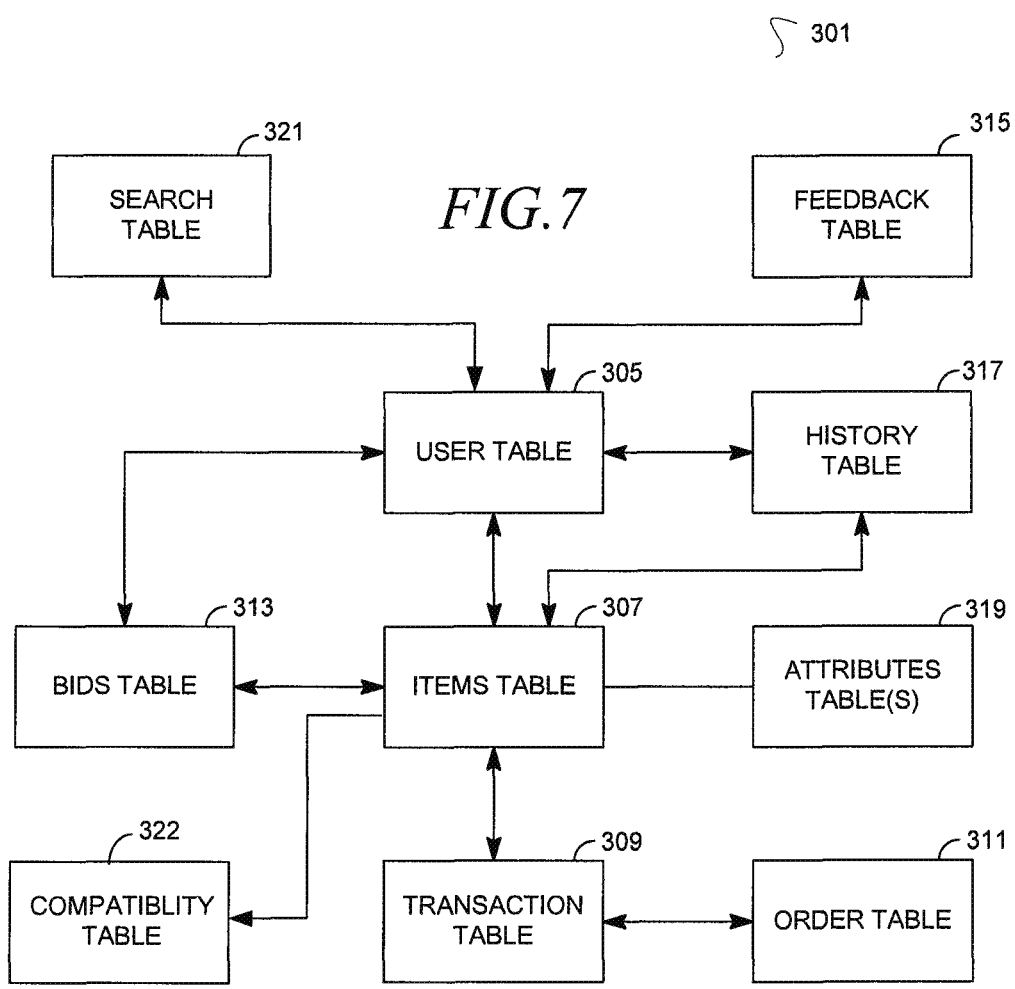
FIG. 7 is a block diagram illustrating tables, according to an embodiment.

FIG. 7 is a high-level entity-relationship diagram illustrating various tables 301 that may be maintained within the databases 224, and that are utilized by and support the marketplace modules 218 and payment modules 220. A user table 305 contains a record for registered users of the network-based marketplace 76. A user may operate as a seller, a buyer, or both, within the network-based marketplace 76. In one example embodiment, a buyer may be a user that has accumulated value (e.g., commercial or proprietary currency), and is accordingly able to exchange the accumulated value for items that are offered for sale by the network-based marketplace 76.

The tables 301 also include an items table 307 in which item records are maintained for goods (e.g., parts) and services that are available to be, or have been, transacted via the network-based marketplace 76. Item records within the items table 307 may furthermore be linked to one or more user records within the user table 305, so as to associate a seller and one or more actual or potential buyers with an item record.

A transaction table 309 contains a record for each transaction (e.g., a purchase or sale transaction) pertaining to items for which records exist within the items table 307.

An order table 311 may be populated with order records, with each order record being associated with an order. Each order, in turn, may be associated with one or more transactions for which records exist within the transaction table 309.

Bid records within a bids table 313 may relate to a bid received at the network-based marketplace 76 in connection with an auction-format listing supported by one or more auction modules 282, as shown in FIG. 7. A feedback table 315 may be utilized by one or more reputation modules 288, in one example embodiment, to construct and maintain reputation information concerning users. A history table 317 may be used to maintain a history of transactions to which a user has been a party. One or more attributes tables 319 record attribute information pertaining to items for which records exist within the items table 307. Considering only a single example of such an attribute, the attributes tables 319 may indicate a currency attribute associated with a particular item, with the currency attribute identifying the currency of a price for the relevant item as specified by a seller. A search table 321 may store search information that has been entered by a user (e.g., buyer) who is looking for a specific type of listing.

Figure 8A:
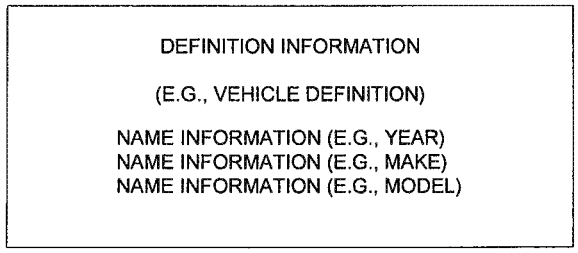
FIG. 8A is a block diagram illustrating definition information, according to an embodiment.
Figure 8B:
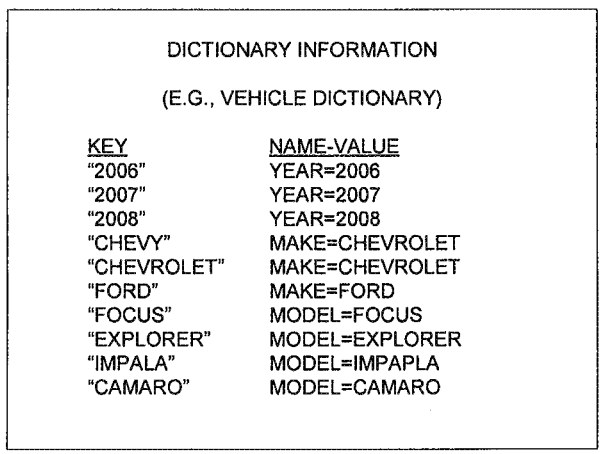
FIG. 8B is a block diagram illustrating dictionary information, according to an embodiment.
Figure 8C:
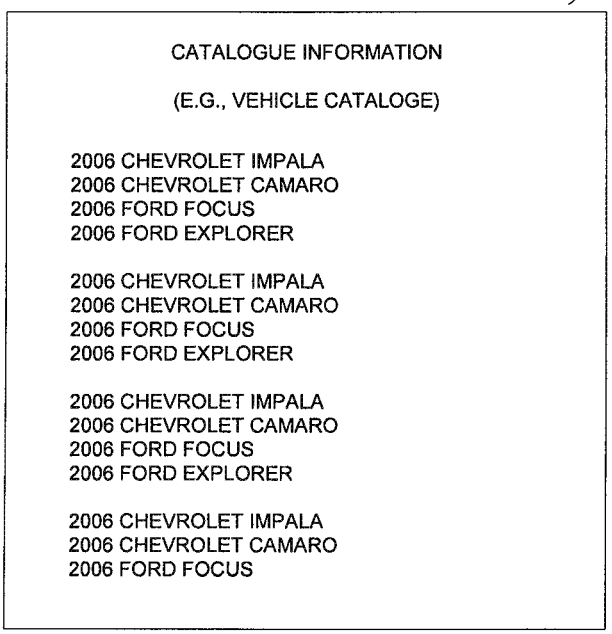
FIG. 8C is a block diagram illustrating catalogue information, according to an embodiment.

A compatibility table 322 may store definition information 400, dictionary information 410, and catalogue information 420, as shown and discussed on FIGS. 8A, 8B and 8C.

FIG. 8A is a block diagram illustrating definition information 400, according to an embodiment. The definition information 400 may be utilized to generate dictionary information, organize name-values according to value sets, and cluster name-values into groups. The definition information 400 may be utilized to define definitions for applications for which a part is compatible. In another embodiment the definition information 400 may be utilized to define definitions for other types of information including attributes from a product description.

FIG. 8B is a block diagram illustrating dictionary information 410, according to an embodiment. The dictionary information 410 may be utilized to identify tokens in a string of text and to associate the tokens with name-value pairs that communicate a semantic of value for the token in a particular context. The dictionary information 410 may include multiple entries of keys associated with name-value pairs. Each key may include one or more words that may be respectively matched to tokens in a string of text. Each key may categorized according to name information in the definition information 400. For example, the key "2006" may correspond to the name information for "year," the key "Ford" may correspond to the name information for "make," and the key "Explorer" may correspond to the name information for "model." They keys may further be used to normalize tokens (e.g., slang, alias, misspellings, terms of art, etc.) to the same name-value. For example, the keys "CHEVY" and "CHEVROLET" both normalize to the name-value "MAKE=CHEVROLET."

FIG. 8C is a block diagram illustrating catalogue information 420, according to an embodiment. The catalogue information 420 may be utilized to validate groups. To this end, the catalogue information 420 may include all known applications in the form of the definition information 400 (e.g., year, make, model). Accordingly, the appearance of an application in the catalogue information 420 constitutes a valid application.

Figure 9A:
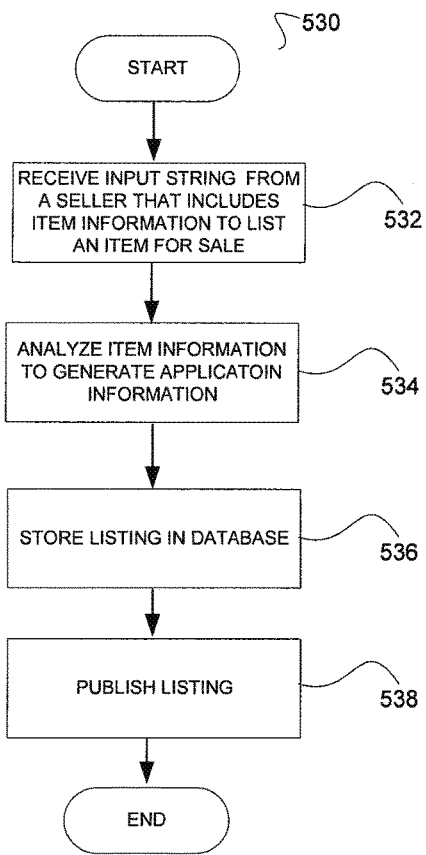
FIG. 9A is a flow chart illustrating a method, according to embodiment, to extract textual semantics.

FIG. 9A is a flow chart illustrating a method 530, according to an embodiment, to extract and utilize textual semantics. At operation 532, the receiving module 325, at the network-based marketplace 76, may receive unstructured information in the form of item information (e.g., string). According to one embodiment, the input string may be received over a network from a client machine 208 operated by a seller or in another embodiment from a client machine 212 operated by a programmatic client. The input string may include item information that describes a part and applications for which the part is compatible. For example, the input string may include the following:
"For Sale—2 Goodyear Tires, like new, $55, Fits the following vehicles:
2006-2008
Chevy—Malibu
Ford—Explr"

At operation 534, the processing module 327 may analyze the item information to generate application information that is structured. For example, the above input string may be utilized to generate application information that is structured as follows:
YEAR=2006, MAKE=CHEVROLET, MODEL=MALIBU
YEAR=2006, MAKE=FORD, MODEL=EXPLORER
YEAR=2007, MAKE=CHEVROLET, MODEL=MALIBU
YEAR=2007, MAKE=FORD, MODEL=EXPLORER
YEAR=2008, MAKE=CHEVROLET, MODEL=MALIBU
YEAR=2008, MAKE=FORD, MODEL=EXPLORER
The operation 534 is described in further detail below in FIG. 9B.

At operation 536, the publishing module 281 may store the above described application information that is structured in the listing and store the listing in the database 224. For example, the publishing module 281 may store application information in the form of a first application (e.g., "YEAR=2006, MAKE=CHEVROLET, MODEL=IMPALA") in the listing in the database 224.

At operation 538, the publishing module 281 may publish the listing on the network-based marketplace 76. For example, the publishing module 281 may publish the listing to enable users to present (e.g., display, extensible markup language (XML), audio, etc.) the listing for sale via the various interfaces (e.g., user interfaces, application processing interfaces, audio interfaces, etc.) supported by the network-based marketplace 76.

Figure 9C:
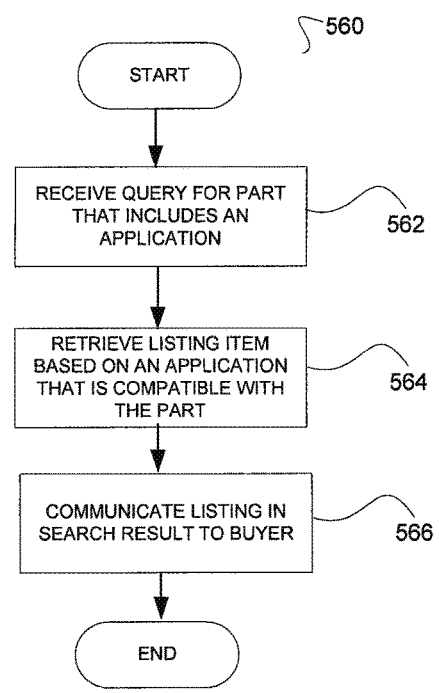
FIG. 9C is a flow chart illustrating a method, according to an embodiment, to enhance a search by utilizing textual semantics.
Figure 9B:
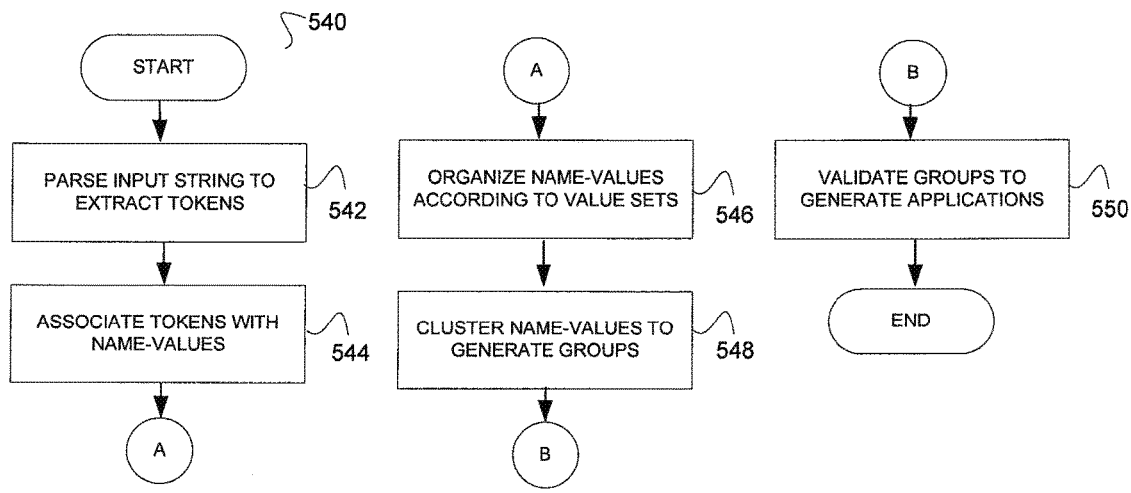
FIG. 9B is a flow chart illustrating a method, according to an embodiment, to analyze item information to generate application information.

FIG. 9B is a flow chart illustrating a method 540, according to an embodiment, to analyze item information to generate application information. The method 540 commences at operation 542, with the processing module 327, at the network-based marketplace 76, parsing the input string to extract tokens. The processing module 327 may utilize dictionary information 410 (e.g., dictionary) that was previously generated based on a definition for a vehicle (e.g., YEAR, MAKE, MODEL) to identify the tokens descriptive of applications (e.g., vehicles). For example, the processing module 327 may compare the keywords in the input string with the keys in the dictionary to identify the tokens. In one embodiment the network-based marketplace may parse a range of numbers from the input string and extract each number in the input range as a token. For example, the processing module 327 may extract the tokens "2006," "2007," and "2008" from the range "2006-2008." In another embodiment, the processing module 327 may parse a wildcard from the input string representing a range from 0-9 and extract each number in the input range as a token. For example, the network-based marketplace may extract the tokens "2000," "2001," "2002," "2003," "2004," "2005," "2005," "2006," "2007," "2008," and "2009" from the string "200*." At operation 544, the processing module 327 may associate each of the extracted tokens to name-values. For example, the token "2006" may be associated with the name-value "YEAR=2000." Also for example, the token "CHEVY" may be associated with the name-value "MAKE=CHEVROLET." It will be appreciated that the slang term "Chevy" has been normalized with the name-value pair "MAKE=CHEVROLET" and the abbreviation "Explr" has been normalized with the name-value pair "MODEL=EXPLORER." At operation 546, the processing module 327 may organize the name-value pairs according to value sets where each value set corresponds to name information (e.g., year, make, model) in a definition for vehicles.

For example, the processing module 327 may organize the name-value pairs in the following three value sets:

| VALUE SET-1 (E.G., YEAR) | VALUE SET-2 (E.G., MAKE) | VALUE SET-3 (E.G., MODEL) |
|---|---|---|
| "YEAR-2006" | "MAKE-CHEVROLET" | "MODEL-MALIBU" |
| "YEAR-2007" | "MAKE-FORD" | "MODEL-EXPLORER" |
| "YEAR-2008" | | |

At operation 548, the processing module 327 may cluster the name-value pairs to generate groups. For example, the processing module 327 may exhaustively utilize all of the name-value pairs to generate groups according to the definition information 400 (e.g., definition) for vehicles. For example, the processing module 327 may generate the following groups

| GROUP NO. | GROUP |
|---|---|
| 1. | "YEAR-2006," "MAKE-CHEVROLET," "MODEL-MALIBU" |
| 2. | "YEAR-2006," "MAKE-CHEVROLET," "MODEL-EXPLORER" |
| 3. | "YEAR-2006," "MAKE-FORD," "MODEL-MALIBU" |
| 4. | "YEAR-2006," "MAKE-FORD," "MODEL-EXPLORER" |
| 5. | "YEAR-2007," "MAKE-CHEVROLET," "MODEL-MALIBU" |
| 6. | "YEAR-2007," "MAKE-CHEVROLET," "MODEL-EXPLORER" |
| 7. | "YEAR-2007," "MAKE-FORD," "MODEL-MALIBU" |
| 8. | "YEAR-2007," "MAKE-FORD," "MODEL-EXPLORER" |
| 9. | "YEAR-2008," "MAKE-CHEVROLET," "MODEL-MALIBU" |
| 10. | "YEAR-2008," "MAKE-CHEVROLET," "MODEL-EXPLORER" |
| 11. | "YEAR-2008," "MAKE-FORD," "MODEL-MALIBU" |
| 12. | "YEAR-2008," "MAKE-FORD," "MODEL-EXPLORER" |

At operation 550, the processing module 327 may validate the groups to generate applications. The processing module 327 may utilize the catalogue information 420 to identify whether a particular group is found in the catalogue information 420. The processing module 327 may remove non-existent groups including group number 2, 3, 6, 7, 10 and 11, leaving the remaining groups to be identified as applications as follows:

| GROUP. NO. | GROUP (APPLICATIONS) |
|---|---|
| 1. | "YEAR-2006," "MAKE-CHEVROLET," "MODEL-MALIBU" |
| 2. | ~~"YEAR-2006," "MAKE-CHEVROLET," "MODEL-EXPLORER"~~ |
| 3. | ~~"YEAR-2006," "MAKE-FORD," "MODEL-MALIBU"~~ |
| 4. | "YEAR-2006," "MAKE-FORD," "MODEL-EXPLORER" |
| 5. | "YEAR-2007," "MAKE-CHEVROLET," "MODEL-MALIBU" |
| 6. | ~~"YEAR-2007," "MAKE-CHEVROLET," "MODEL-EXPLORER"~~ |
| 7. | ~~"YEAR-2007," "MAKE-FORD," "MODEL-MALIBU"~~ |
| 8. | "YEAR-2007," "MAKE-FORD," "MODEL-EXPLORER" |
| 9. | "YEAR-2008," "MAKE-CHEVROLET," "MODEL-MALIBU" |
| 10. | ~~"YEAR-2008," "MAKE-CHEVROLET," "MODEL-EXPLORER"~~ |
| 11. | ~~"YEAR-2008," "MAKE-FORD," "MODEL-MALIBU"~~ |
| 12. | "YEAR-2008," "MAKE-FORD," "MODEL-EXPLORER" |

Other Embodiments

Other embodiments of the above method 540 may include processing that is more selective in the identification of groups. For example, consider the following input string:

"AXIS metal Master Brake Pads New in Box

Toyota MR2 1985-89, Toyota Corolla 1987-92, Celica GTS 1986-89, Geo Prizm1989-92."

The author of above input string most likely intends particular ranges of years to be associated with particular makes and models. For example, the author probably intends the range of years "1985-89" to be associated with the "Toyota MR2" make and model and not the "Toyota Corolla," "Celica GTS" or "Geo Prizm" make/model combinations. Also for example, consider the following input string:

"New Jersey American Titanium Ti22 Advanced Brake Technology SSD441

INFINITY 1990-1992 M30;

NISSAN
1985-1988 Maxima
1986-1989 Stanza"

Again the author of above input string most likely intends particular ranges of years to be respectively associated with the "INFINITY" makes and models and the "NISSAN" makes and models.

According to one embodiment of the method 540, the processing module 327 may selectively identify groups in a string by utilizing a rule set. For example, the rule set may include a rule that includes a condition clause to evaluate part or all the input string and an execution clause to perform a function responsive to the condition clause evaluating TRUE. According to one embodiment, the condition clause may evaluate TRUE responsive to the identification of delimiters in the string including commas, line breaks, and rows that signal an affinity of a set of name-value pairs with each other. Accordingly, the processing module 327 may utilize the rule set to identify and organize name-values pairs with an affinity for each other according to multiple sub-value sets that are respectively utilized to generate groups. The processing module 327 may generate groups for a particular sub value-set by retrieving the name-value pairs associated with the sub-value set and generating all permutations of the retrieved name-value pairs. The processing module 327 may iteratively repeat this process for each sub-value set until all groups are generated. Accordingly, the processing module 327 may generate groups based on name-value pairs with a rule set that identifies an affinity between name-value pairs based on delimiters in the string.

According to another embodiment of the method 540, the processing module 327 may selectively identify groups in a string based on the sequential appearance of the types of name-value pairs in the string. According to this embodiment, the processing module 327 may parse a string and utilize a definition of YEAR, MAKE, and MODEL to identify types of name-value pairs as associated with different sub-value sets. For example, the processing module 327 may sequentially identify name-value pairs as follows: "MAKE, MODEL, YEAR, YEAR, MAKE, MODEL, YEAR, YEAR, YEAR . . . ) whereby the identification of the second "MAKE" in the string signals a boundary between the name-value pairs of the first sub-value set and the name-value pars of the second sub-value set. As described above, the processing module 327 may iteratively generate groups based on all permutations of name-value pairs within each sub value-set until all sub value-sets have been processed.

According to another embodiment of the method 540, the processing module 327 may selectively identify groups in a string by utilizing an algorithm that associates each token with one or more values that specifies the distance of the token from other tokens in the string. According to this embodiment, the processing module 327 may identify name-value pairs as associated with different sub-value sets based on the proximity of one token with another. As described above, the processing module 327 may iteratively generate groups based on all permutations of name-value pairs within each sub value-set until all sub value-sets have been processed.

FIG. 9C is a flow chart illustrating a method 560, according to an embodiment, to utilize textual semantics to enhance the recall of a search. The method 560 commences at operation 562 with the retrieving module 329, at the network-based marketplace 76, receiving a query, over a network, from a client machine 208 operated by a buyer who wants to buy tires. For example, the query may include "Goodyear Tires fits 2007 Ford Explorer." At operation 564, the retrieving module 329 may utilize the item (e.g., Goodyear Tires) and the applications (e.g., 2007 Ford Explorer) in the query to retrieve listings from a database. For example, the retrieving module 329 may identify the string "2007 Ford Explorer" as the application (e.g., "2007=YEAR," "MAKE=FORD," and "MODEL=EXPLORER") and generate a converted query to retrieve listings for "Goodyear Tires" that further are associated with the same application from the database. For example, the converted query may include "Goodyear Tires" AND ("2007=YEAR," "MAKE=FORD," "MODEL=EXPLORER"). At operation 566, the retrieving module 329 may communicate, over a network, the listing in search results to the buyer.

Other Embodiments

The above embodiment describes an extraction and utilization of textual semantics responsive to a seller listing an item for sale or auction on a network-based marketplace and a buyer querying for the item. In another embodiment, textual semantics may be extracted and utilized responsive to a seller revising a listing on the network-based marketplace. For example, the user may revise a listing by adding text, a picture, or an illustration to the listing or removing the same from the listing. Responsive to the revision of the listing, the network-based marketplace may utilize text in the listing as input to the above described method to generate applications and supplement the listing with the applications. Accordingly, the network-based marketplace 76 may utilize the applications to process subsequent queries for items as described above. In another embodiment, textual semantics may be extracted and utilized responsive to the relisting of a closed listing. For example, a listing of an item may be designated closed once an auction ends without a winner. Sellers who desire to sell or auction the listing pay a fee and relist the listing. Responsive to the relisting of the listing, the network-based marketplace may utilize text in the listing as input to the above described method to generate applications and supplement the listing with the applications. Accordingly, the network-based marketplace 76 may utilize the applications to process subsequent queries for items as described above.

In yet another embodiment the network-based marketplace 76 may receive unstructured text from a seller that describes an item, convert the unstructured text to structured text that communicates the semantics of the unstructured text, create a listing on a network-based marketplace 76 to sell or auction the item, with the listing including the structured text to communicate the semantics of the unstructured text, and communicate the structured text in an interface that displays the structured text in an organized manner to a user (e.g., buyer) who views the item. For example, a seller may provide unstructured text describing an item with different descriptions that are tokenized to extract a set of attributes. The extracted attributes may be associated with name-value pairs (e.g., item specifics) and clustered into groups (e.g., manufacturer, model, memory size of a cell phone). Tagging the listing/item with the item specifics that are logically grouped together for display to a buyer may relieve the buyer from sifting through descriptions because the buyer has one consolidated place to view item specifics according to groups and can therefore make more informed choices about the item they are viewing.

In yet another embodiment, the system may respond to a query by retrieving the listing by matching the query to the above described item specifics in the listing.

Figure 10:
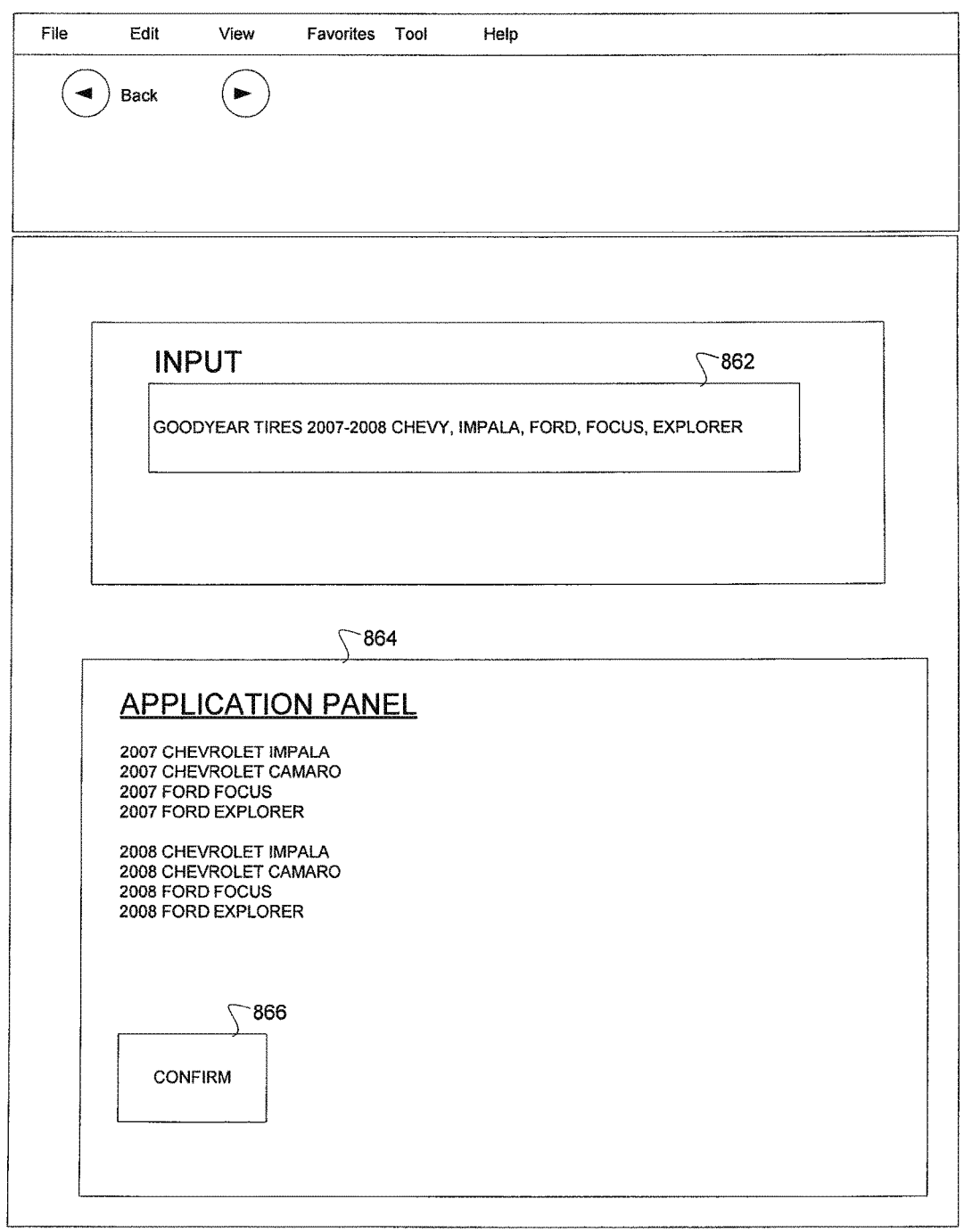
FIGS. 10-13 are diagrams illustrating various user interfaces, according to an embodiment.

FIG. 10 is a diagram illustrating user interface 860, according to an embodiment. The user interface 860 may include an input box 862, an application panel 864, and a confirmation button 866. The user interface 860 may be included in a web page flow that may be used to list an item for auction or sale on a network-based marketplace. The input box 862 may be utilized to receive a string of text that includes keywords describing applications (e.g., vehicles) for which the part is compatible. The application panel 864 may display the applications that have been identified based on the received string of text. The confirmation button may be used to communicate a message to the network-based marketplace that confirms the applications appearing in the application panel as compatible with the item and causes the applications to be stored in the listing.

Figure 11:
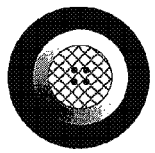

FIG. 11 is a diagram illustrating user interface 870, according to an embodiment. The user interface 870 may include a title 872 and a compatibility tab 874. The user interface 860 may be utilized to review an item for auction or sale on a network-based marketplace. The title 872 may provide title information for an item. The compatibility tab 874 may display applications (e.g., vehicles listed) for which the item (e.g., Goodyear Tires) is compatible.

Figure 12:
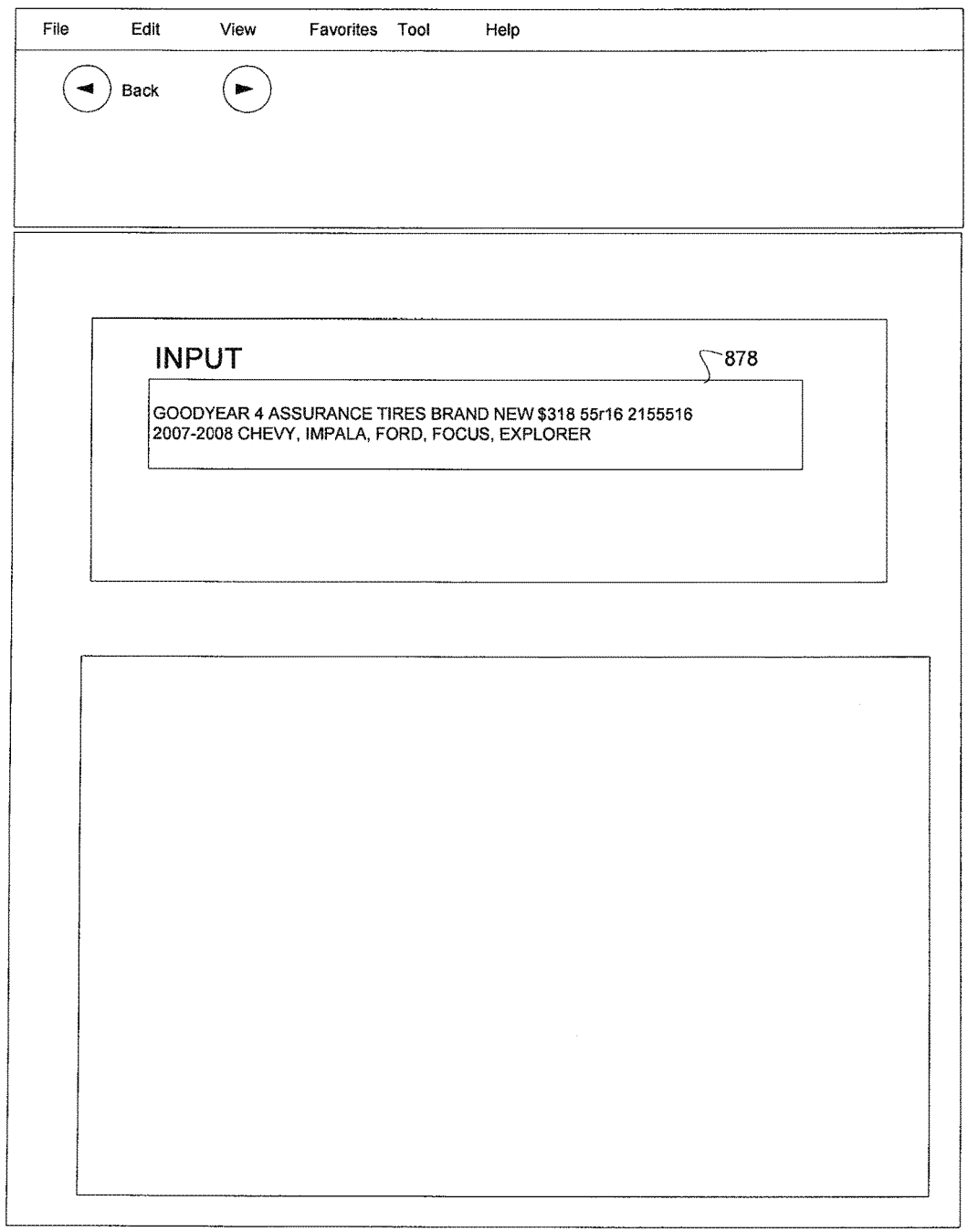

FIG. 12 is a diagram illustrating user interface 876, according to an embodiment. The user interface 876 may be included in a web page flow to list an item for auction or sale on a network-based marketplace 76. The user interface 876 may include an input box 878 that is utilized by the receiving module 325 to receive unstructured information that is processed by the processing module 327 to generate item specific information. The unstructured information may be received in the form of item information that includes keywords that describe an item (e.g., part) and one or more applications (e.g., vehicles) for which the part is compatible and are stored in the listing. The item information that describes the item may be used to generate item specific information. For example, the inputted information in the input box 878 includes the phrase "brand new," which may be utilized to generate item specific information in the form of a name-value pair for a condition (e.g., CONDITION=NEW) that is stored in the listing. Further, for example, the input information in the input box 878 includes the price "$318," which may be utilized to generate item specific information in the form of a name-value pair for a price (e.g., PRICE=318USD) and stored in the listing.

Figure 13:
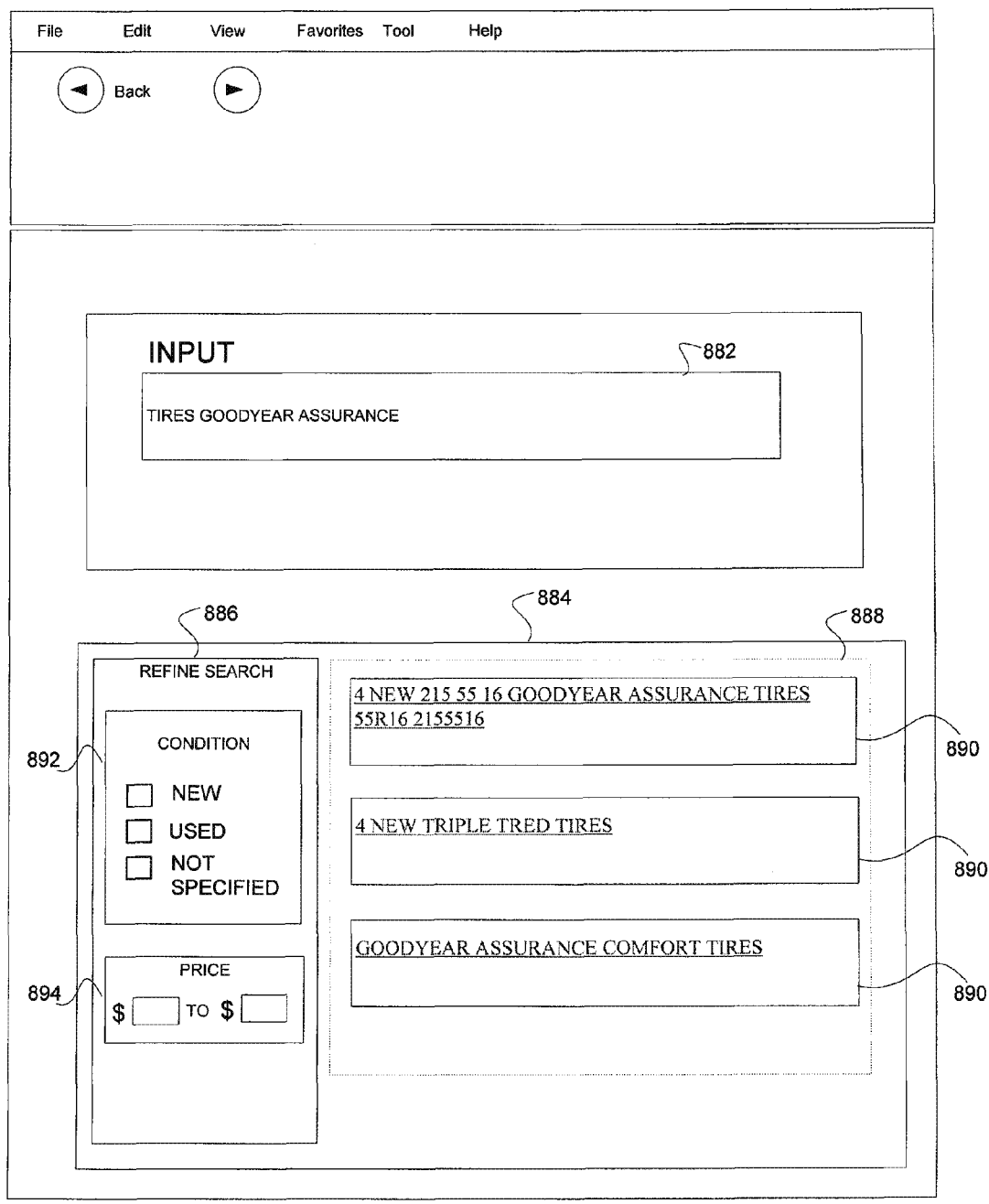

FIG. 13 is a diagram illustrating user interface 880, according to an embodiment. The user interface 880 may include an input box 882 used to receive a query, a listing panel 884 that includes some or all of the listings 890 that have been retrieved based on the query, and an item specific panel 886 that may be utilized to filter the listings retrieved with the query. For example, the item specific information may include a condition item specific 892 and a price item specific 894. The condition item specific 892 may be utilized to receive a value (e.g., NEW, USED, NOT SPECIFIED) that is compared with name-value pairs respectively stored in the retrieved listings. In addition, the price item specific 894 may be utilized to receive a numerical range of values that specifies a national (e.g., USD, GBP, CAD, AUD, etc.) or proprietary currency (e.g., Frequent Flier Miles, etc.) that is compared with item specific information in the form of a numerical range of values respectively stored in the retrieved listings. Accordingly, the user may utilize the interface 880 to filter the listings 890 that are retrieved for display in the input box 882 based on the item specific information (e.g., condition, price, etc.).

The above-described user interfaces are illustrated to include user interface elements. However, it will be appreciated by those skilled in the art that the user interfaces may also be embodied as a machine interface (e.g., Standard Generalized Markup Language (SGML)) including machine interface elements, an audio interface including audio interface elements, and a kinetic interface including kinetic interface elements.

In some embodiments, the methods described herein may be implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level and communicates the results of these logical/mathematical manipulations to the interface tier and/or to a backend, or storage, tier. These logical/mathematical manipulations may relate to certain business rules or processes that govern the software application as a whole. A third, storage, tier may be a persistent storage medium or non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer-to-peer, or so some other suitable configuration. Further, these three tiers may be distributed between multiple computer systems as various software components.

Some example embodiments may include the above illustrated tiers, and processes or operations that make them up, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various APIs and then compiled into one complete server, client, and/or peer software application. Further, these APIs may be able to communicate through various distributed programming protocols as distributed computing components.

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language by using a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transport Control Protocol/Internet Protocol (TCP/IP) protocol stack model for defining the protocols used by a network to transmit data.

Some embodiments may utilize the OSI model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), WAN, or some other suitable network. In some cases, "Internet" refers to a network of networks. These networks may use a variety of protocols for the exchange of data, including the aforementioned TCP/IP, and additionally asynchronous transfer mode (ATM), system network architecture (SNA), SDI, or some other suitable protocol. These networks may be organized within a variety of topologies (e.g., a star topology) or structures.

Figure 14:
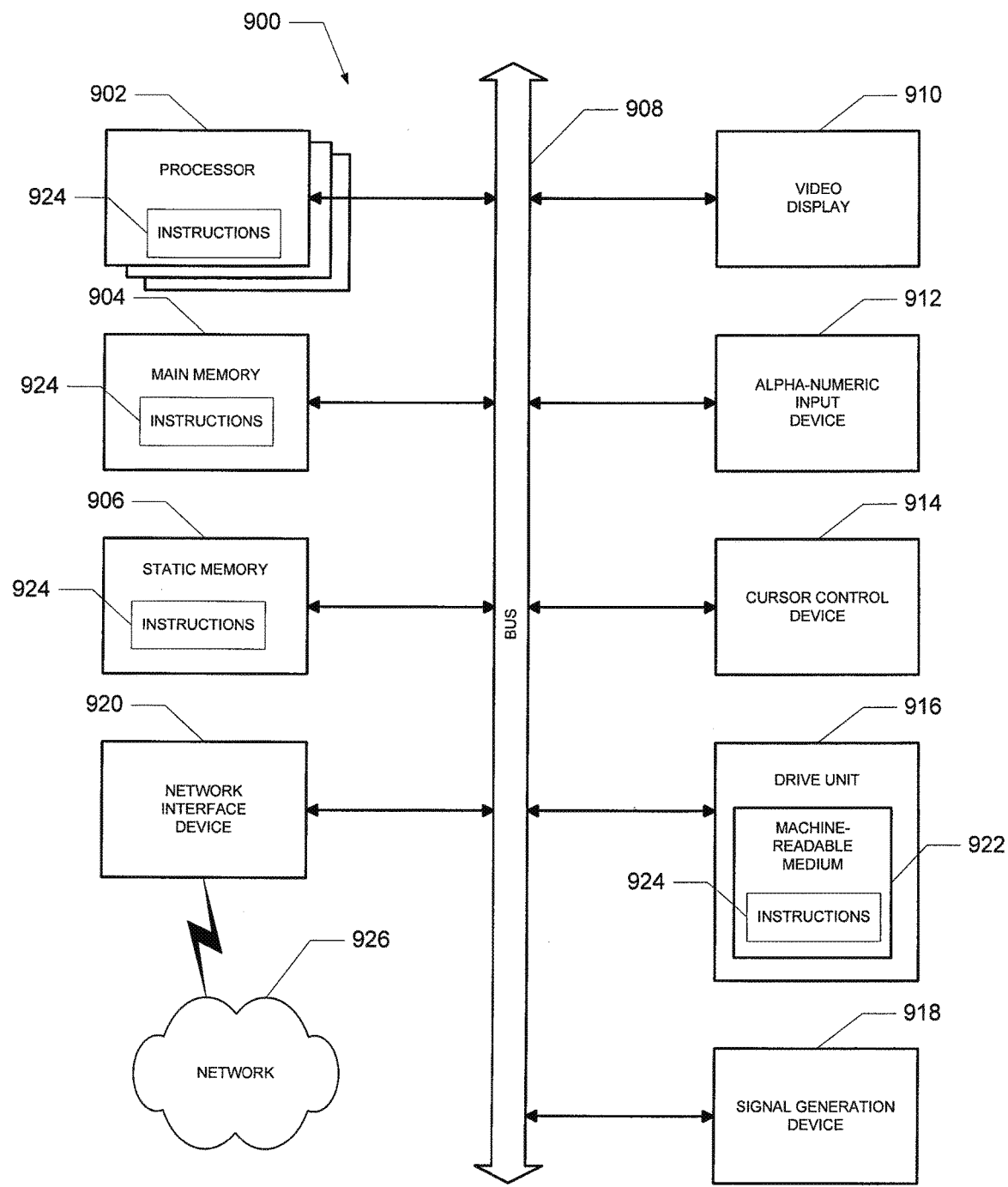
FIG. 14 shows a diagrammatic representation of a machine in the example form of a computer system, according to an example embodiment.

FIG. 14 shows a diagrammatic representation of a machine in the example form of a computer system 900 within which a set of instructions may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes one or more processors 902 (e.g., a central processing unit (CPU), a graphics processing unit (GPU), or both), a main memory 904 and a static memory 906, which communicate with each other via a bus 908. The computer system 900 may further include a video display unit 910 (e.g. a liquid crystal display (LCD) or a cathode ray tube (CRT)). The computer system 900 also includes an input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions (e.g., software) 924 embodying any one or more of the methodologies or functions described herein. The instructions 924 may also reside, completely or at least partially, within the main memory 904, the static memory 906, and/or within the processor 902 during execution thereof by the computer system 900. The main memory 904 and the processor 902 also may constitute machine-readable media. The instructions 924 may further be transmitted or received over a network 926 via the network interface device 920.

Software applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any non-transitory medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical media and magnetic media. As noted, the software may be transmitted over a network using a transmission medium. The term "transmission medium" shall be taken to include any medium that is capable of storing, encoding or carrying instructions for transmission to and execution by the machine, and includes digital or analogue communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, systems and methods to extract and utilize textural semantics were described. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

What is claimed is:

1. A method comprising:
   receiving unstructured text from a first user via a first interface communication, the unstructured text including item information describing an item for publication on a network-based publication system;
   analyzing the item information to generate structured text signifying at least one meaning of the unstructured text, the structured text including application information describing a plurality of applications including a first application, the first application including the item as a first component, the application information including a first application information describing the first application, the analyzing being performed by the use of at least one processor;
   storing the application information describing the plurality of applications and the item information in a listing in a database;
   publishing the listing on the network-based publication system;
   receiving a query from a second user including keywords that describe the item and a second application including the item;
   generating second application information describing the second application responsive to identifying the keywords in the query that describe the second application;
   retrieving the listing from the database based on matching the second application information that was generated from the keywords in the query with the first application information that was stored in the listing; and
   communicating the listing in a second interface communication to the second user, the second interface communication including visually perceptible user interface elements signifying the item and visually perceptible user interface elements signifying the first application as compatible with the item.

2. The method of claim 1, wherein the analyzing is further comprising:
   extracting tokens from the item information; and
   associating the tokens with name-value pairs based on the tokens.

3. The method of claim 2, wherein the analyzing further comprises:
   organizing the name-value pairs according to value sets based on definition information; and
   clustering the value sets based on the definition information to generate a plurality of groups.

4. The method of claim 3, wherein the analyzing further comprises:
   validating the plurality of groups based on catalogue information to identify whether the plurality of groups includes a first group that corresponds to the first application.

5. The method of claim 4, wherein the validating further comprises identifying the first application in the catalogue information.

6. The method of claim 1, further comprising analyzing the item information to generate structured text including item specific information.

7. The method of claim 6, further comprising storing the item specific information in the listing.

8. The method of claim 7, wherein the structured text includes a name-value pair that describes a condition of the item and wherein the condition of the item is new.

9. The method of claim 1, wherein the analyzing is responsive to the receiving the item information from the first user.

10. A system comprising:
    one or more computers that are configured to provide a network-based publication system that is configured to:
    communicate a first interface communication to a first user;
    receive unstructured text from the first user via the first interface communication, the unstructured text including item information that describes an item for publication on a network-based publication system;
    analyze the item information to generate structured text signifying at least one meaning of the unstructured text, the structured text including application information that describes a plurality of applications including a first application, the application information further describing the first application including the item as a first component, the application information including a first application information describing the first application;
    store a listing in a database, the listing including the application information and the item information and further publish the listing on the network-based publication system;
    receive a query from a second user including keywords that describe the item and a second application including the item, generate second application information that describes the second application responsive to an identification of the keywords in the query that describe the second application, retrieve the listing from the database based on a match of the second application information that was generated from the keywords in the query with the first application information that was stored in the listing; and
    communicate the listing in a second interface communication to the second user, the second interface communication including visually perceptible user interface elements signifying the item and visually perceptible user interface elements signifying the first application as compatible with the item.

11. The system of claim 10, wherein the network-based publication system is further configured to extract tokens from the item information and associates the tokens with name-value pairs based on the tokens.

12. The system of claim 11, wherein the network-based publication system is further configured to organize the name-value pairs according to value sets based on definition information and clusters the value sets based on the definition information to generate a plurality of groups.

13. The system of claim 12, wherein the network-based publication system is further configured to validate the plurality of groups based on catalogue information to identify whether the plurality of groups includes a first group that corresponds to the first application.

14. The system of claim 10, wherein the network-based publication system is further configured to identify the first application in the catalogue information.

15. The system of claim 10, wherein the network-based publication system is further configured to analyze the item information to generate structured text including item specific information.

16. The system of claim 15, wherein the network-based publication system is further configured to store the item specific information in the listing.

17. The system of claim 16, wherein the structured text includes a name-value pair that describes a condition of the item and wherein the condition of the item is new.

18. The system of claim 10, wherein the network-based publication system is further configured to analyze the item information responsive to receiving the item information from the first user.

19. A machine-readable medium having no transitory signal and storing instructions that, when executed by one or more processors of a machine, cause the machine to perform operations comprising:

receiving unstructured text from a first user via a first interface communication, the unstructured text including item information describing an item for publication on a network-based publication system;

analyzing the item information to generate structured text signifying at least one meaning of the unstructured text, the structured text including application information describing a plurality of applications including a first application including the item as a first component, the application information including a first application information describing the first application, the analyzing being performed by the use of at least one processor;

storing the application information describing the plurality of applications and the item information in a listing in a database;

publishing the listing on the network-based publication system;

receiving a query from a second user including keywords that describe the item and a second application including the item;

generating second application information describing the second application responsive to identifying the keywords in the query that describe the second application;

retrieving the listing from the database based on matching the second application information that was generated from the keywords in the query with the first application information that was stored in the listing; and communicating the listing in a second interface communication to the second user, the second interface communication including visually perceptible user interface elements signifying the item and visually perceptible user interface elements signifying the first application as compatible with the item.

* * * * *